Figure 1:
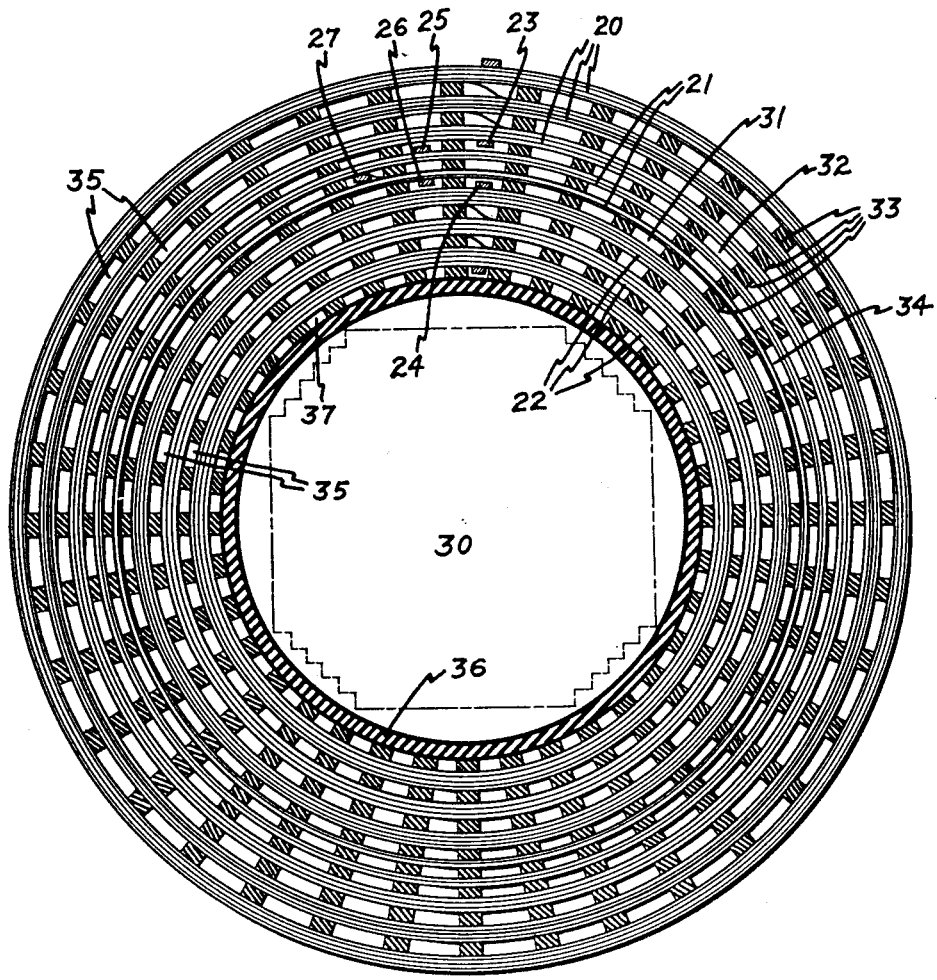

Sept. 18, 1962  L. RABINS  3,054,974
WINDING ARRANGEMENT FOR FOIL WOUND TRANSFORMER
Filed April 5, 1957  2 Sheets-Sheet 1

Inventor,
Leonard Rabins,
by Gilbert P. Tarleton
His Attorney.

Inventor,
Leonard Rabins,
by Gilbert P. Tarlton
His Attorney.

United States Patent Office 3,054,974
Patented Sept. 18, 1962

3,054,974
WINDING ARRANGEMENT FOR FOIL WOUND TRANSFORMER
Leonard Rabins, Pittsfield, Mass., assignor to General Electric Company, a corporation of New York
Filed Apr. 5, 1957, Ser. No. 651,019
2 Claims. (Cl. 336—60)

This invention relates to foil wound transformers, and more in particular to an improved winding arrangement to facilitate bringing out tap leads of a foil wound transformer.

As a result of the economic advantages of employing conducting foil in windings of electric apparatus, the recent availability of foil as a competing material for wire has been accompanied by the use of such foil in the windings of transformers. At the present time, however, the size of transformers employing foil windings has been limited due to the difficulties that arise in the fabrication of larger apparatus. For example, on some transformers it is necessary to provide taps in the windings. Aside from the difficulty of providing positive contact between a tap lead and the foil, the physical dimensions of the tap lead require the provision of ducts through the winding through which the leads extend.

To explain more clearly, a foil winding may be comprised of an insulating winding cylinder surrounded by a plurality of radially superposed layers of insulated conducting foil, such as aluminum foil. Tap leads connected to the foil intermediate its ends extend axially of the winding. The tap leads must not extend for an appreciable distance circumferentially of the winding in order that opposite edges of the lead do not have different potentials, and therefore the leads must have appreciable thickness.

When an electrical winding is subject to short circuit currents, large radial forces arise in the winding, and these forces tend to force the winding radially outwardly into a circular shape. When two or more concentric windings, having currents that tend to set up opposing magnetic fields, are subject to short circuit currents, the forces tend to force the outermost winding radially outward into a circular shape, and tend to collapse the innermost winding. From the standpoint of mechanical strength to resist the outward radial forces, it is desirable to initially form the turns of the winding to a circular shape. When the winding is circular, however, any ducts that are provided for extending tap leads through the winding must extend completely around the winding in order that the circular shape of the winding be maintained.

In providing a foil winding for a large transformer, it is also necessary to provide cooling ducts extending through the winding. The cooling ducts divide the winding into a plurality of radial groups of turns, and the groups of turns may be radially separated by insulating spacers extending generally axially of the winding.

The size and position of the cooling ducts employed is of course dictated by the thermal characteristics of the winding. Similarly, the radial positions and numbers of ducts provided for tap leads are dictated by the circuit arrangement of the windings. While some of the tap lead ducts may coincide with cooling ducts, the tap leads required are generally provided between a smaller number of turns than is required for efficient cooling of the winding, and therefore the ducts required solely for bringing out tap leads result in an increase in the radial build of the coil. Even though some tap lead ducts do coincide with cooling ducts, the tap lead ducts generally require a greater width than the cooling ducts because the tap leads in many cases must be insulated.

Any increase in the radial build of the winding is undesirable, however, since the reactance and the winding resistance are thereby increased. If, however, it is possible to reduce the reactance and winding resistance by reducing the radial build of the winding, then less magnetic material and conductor material are necessary in a transformer having the same electrical characteristics as a transformer with a greater radial build. Therefore, transformer weight and cost may be reduced by reducing the radial build of the winding.

As another consideration, while it may be possible to decrease the number of taps required on a winding for a given number of tap positions by having the taps at either end of the winding, this is undesirable from the standpoint of electrical characteristics since if the taps are on the radially inward end of the winding, in some tap positions some of the turns of the winding will be inactive, and the reactance of the winding will therefore vary with the tap position, and if the taps are in the radially outward end of the winding, it may be difficult to insulate the tap selector.

It is therefore an object of this invention to provide an improved winding arrangement for a foil wound transformer.

It is a further object to provide a winding for a foil wound transformer wherein the addition of radial build solely for bringing out tap leads is minimized.

Briefly stated, in accordance with the preferred embodiment of my invention, I provide an electrical winding comprised of insulated conducting foil spirally wound to form three concentric electrically separated groups of turns. The groups of turns are separated by generally axially extending annular ducts. Tap leads are provided extending through the ducts and connected to the ends of the turns that terminate within the ducts. Additional tap leads may be connected to the turns of the intermediate one of the groups of turns, and the intermediate one of the groups of turns has substantially less turns than the other groups.

While the specification concludes with claims particularly pointing out and distinctly claiming the subject matter which I regard as my invention, it is believed that the invention will be better understood from the following description taken in connection with the accompanying drawings.

Figure 2:
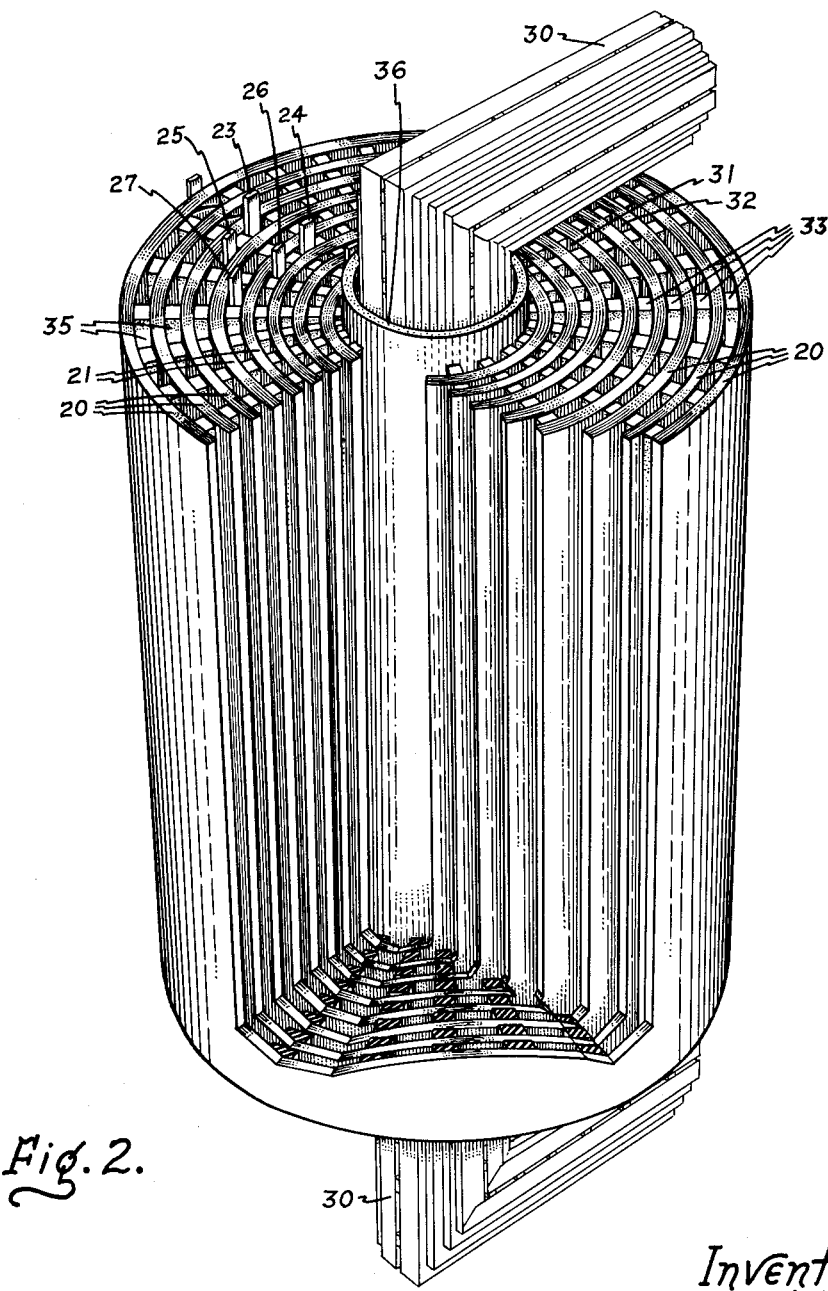

In the drawings:
FIG. 1 is an end view of a foil winding and illustrating the tapped arrangement of my invention, and
FIG. 2 is a perspective partially broken away view of the windings of FIG. 1 mounted on the winding leg of a magnetic core.

My invention may be more clearly understood by referring to the drawings wherein a winding is shown disposed about the leg of a magnetic core 30. The winding is comprised of insulated conducting foil, such as aluminum foil, spirally wound to form a plurality of concentric groups of turns, such as the groups 22, 21 and 20. In the illustration, the group of turns 22 is the radially innermost group of turns, the group 20 is the radially outermost group of turns, and the group 21 is the intermediate group of turns. The group of turns 22 is separated from a group of turns 21 by an axially extending annular duct 31, and the group of turns 21 is separated from the group of turns 20 by axially extending annular duct 32. A duct 34 is also provided intermediate the ends of the groups of turns 21. The ducts are provided with axially extending spacing members 33 to maintain the spacing and concentricity of the coils. Additional cooling ducts 35 may also be provided in the winding groups for cooling the winding, the number of such additional ducts required being determined by the thermal characteristics of the winding.

The winding may be formed on an insulating cylinder 36, although the winding may also be formed over another winding, and the group of turns 22 are preferably separated from the winding cylinder by a cooling duct 37.

Stil referring to FIGS. 3 and 4, the inner end tap 23 of winding group 20 extends into the duct 32 to connect to the winding group 20, and the outer end tap 25 of winding group 21 also extends into the duct 32 to connect to the winding group 21. Similarly, the outer end tap 24 of winding group 22 extends into duct 31 to connect to winding group 22, and inner end tap 26 of winding group 21 extends into the duct 31 to connect to the inner end of winding group 21. The mid tap 27 of winding group 21 extends into the duct 34.

In the winding the drawings, if it is desired for example, to provide four 2½% taps, the winding group 21 would have 5% of the total turns of the winding. Then, for neutral voltage output of the winding, the end tap 23 of winding group 20 and the end tap 24 of winding group 22 would be connected together, or if possible by the switches employed, or both connected to the mid tap 27 of winding group 21. For —5% voltage, the tap 23 of winding group 20 is connected to opposite end tap 26 of winding group 21, and tap 24 is connected to opposite end tap 25 of winding group 21. For —2½% voltage the tap 23 may be connected to mid tap 27 of winding group 21 and the tap 24 may be connected to opposite end tap 25 of winding group 21. For +2½% voltage, the tap 23 may be connected to adjacent end tap 25 of winding group 21 and the tap 24 may be connected to mid tap 27 of winding group 21. For +5% voltage, the end tap 23 of winding group 20 is connected to adjacent end tap 25 of winding group 21, and end tap 24 of winding group 22 is connected to adjacent end tap 26 of winding group 21.

By providing the tap arrangement of this invention on a foil wound transformer, the number of ducts required for bringing out tap leads is minimized since two tap leads are brought out in each of two ducts. Thus, for example, only three tap lead ducts are required for a winding having five tap positions. By thus minimizing the number of ducts required for tap leads, the radial build of the winding is minimized.

The importance of reduction in the radial dimension of the winding achieved by my invention arises in the reduction of winding reactance and resistance, as has previously been stated, so that in addition to the reduction in space, it is possible to reduce the weight of the magnetic core and conducting foil employed, and thus the total cost of the apparatus is reduced. In view of the highly competitive nature of the stationary electrical induction apparatus industry, any reduction in weight, size and cost is extremely important.

While my invention has specifically disclosed the intermediate winding group 21 as being a 5% winding with one mid tap 27, it will be obvious that the winding group 21 may have other proportions with respect to the total winding as dictated by the voltage variation required in any given instance, although it may be stated that the winding group 21 will normally have substantially less turns than the total turns of winding groups 20 and 22. Similarly, the winding group 21 may be provided without a tap intermediate its ends, or it may have additional taps as desired.

It will be understood, of course, that, while the form of the invention herein shown and described constitutes the preferred embodiment of my invention, it is not intended herein to illustrate all of the equivalent forms or ramifications thereof. It will also be understood that the words employed are words of description rather than of limitation, and that various changes may be made without departing from the spirit or scope of the invention herein disclosed, and it is intended in the appened claims to cover all such changes as fall within the true spirit and scope of the invention.

What I claim as new and desire to secure by Letters Patent of the United States is:

1. An electrical winding comprising insulated conducting foil spirally wound to form a radially inner group of turns, an intermediate group of turns, and a radially outer group of turns, said groups of turns being concentric and electrically separated, a first axially extending annular duct separating said inner and intermediate groups, a second axially extending duct separating said outer and intermediate groups, first and second tap leads extending from said first duct and connected to one end respectively of said inner and intermediate groups of turns, third and fourth tap leads extending from said second duct and connected to the other end of said intermediate group and one end of said outer group respectively, and a fifth tap lead connected intermediate the ends of said intermediate group and extending from a third axial extending duct in said intermediate group, said intermediate group having substantially less turns than the other said groups.

2. The winding of claim 1 in which said intermediate group has substantially five percent of the turns of said winding.

References Cited in the file of this patent

UNITED STATES PATENTS

| | | |
|---|---|---|
| 2,521,513 | Gray | Sept. 5, 1950 |
| 2,710,947 | Gaston | June 14, 1955 |
| 2,756,397 | Cederstrom et al. | July 24, 1956 |
| 2,783,441 | Camilli | Feb. 26, 1957 |
| 2,827,616 | Manning | Mar. 18, 1958 |
| 2,863,130 | Gray et al. | Dec. 2, 1958 |
| 2,866,955 | Mees et al. | Dec. 30, 1958 |